(12) United States Patent
Sengstock et al.

(10) Patent No.: US 9,279,383 B2
(45) Date of Patent: Mar. 8, 2016

(54) ARRANGEMENT OF A VALVE COVER ON THE CYLINDER HEAD OF AN INTERNAL COMBUSTION ENGINE

(71) Applicant: MAN Truck & Bus AG, Munich (DE)

(72) Inventors: Harald Sengstock, Nuremberg (DE); Andreas Dietmair, Augsburg (DE); Tino Rudert, Merseburg (DE); Udo Fakler, Winkelhaid (DE)

(73) Assignee: MAN Truck & Bus AG, Munich (DE)

( * ) Notice: Subject to any disclaimer, the term of this patent is extended or adjusted under 35 U.S.C. 154(b) by 179 days.

(21) Appl. No.: 13/657,922

(22) Filed: Oct. 23, 2012

(65) Prior Publication Data
US 2013/0104837 A1    May 2, 2013

(30) Foreign Application Priority Data
Oct. 26, 2011 (DE) .......................... 10 2011 116 934

(51) Int. Cl.
*F02F 7/00*    (2006.01)
(52) U.S. Cl.
CPC ...................................... *F02F 7/006* (2013.01)
(58) Field of Classification Search
CPC .......... F02F 1/24; F02B 77/10; F02B 77/082; F02B 77/02
USPC ................... 123/193.5; 220/326; 411/12, 262, 411/341–343
See application file for complete search history.

(56) References Cited

U.S. PATENT DOCUMENTS

| | | | | |
|---|---|---|---|---|
| 2,724,378 | A * | 11/1955 | Wellman .................... | 123/198 R |
| 3,115,268 | A | 12/1963 | de Genove | |
| 4,027,644 | A * | 6/1977 | Timour ...................... | 123/198 E |
| 7,051,695 | B1 * | 5/2006 | Kowis ....................... | 123/195 C |
| 7,065,963 | B2 * | 6/2006 | Niwa .......................... | 60/323 |

* cited by examiner

*Primary Examiner* — Lindsay Low
*Assistant Examiner* — Kevin Lathers
(74) *Attorney, Agent, or Firm* — Cozen O'Connor

(57) ABSTRACT

A valve cover of a internal combustion engine is fixed on the cylinder head by a plurality of screwed joints, preferably with a circumferential gasket inserted in between. At least some of the screwed joints are provided and/or coupled in such a way with a resiliently and/or elastically flexible element (11) on a cold side (3) of the cylinder head (1), which faces away from the at least one exhaust port in the cylinder head (1) and hence faces a cold side of the engine, that the valve cover (2) lifts off from the cylinder head (1) in a defined area of the cover only in the area of said cold side (3) when there is a defined excess pressure in the crankcase.

19 Claims, 5 Drawing Sheets

ARRANGEMENT OF A VALVE COVER ON THE CYLINDER HEAD OF AN INTERNAL COMBUSTION ENGINE

BACKGROUND OF THE INVENTION

1. Field of the Invention

The present invention relates to an arrangement of a valve cover on the cylinder head of an internal combustion engine.

2. Description of the Related Art

The blow-by gases flowing off in the crankcases of internal combustion engines are generally discharged via a crankcase breather, which is integrated into the cylinder head and is, as a rule, covered by a valve cover. By virtue of their construction, the valve covers are not designed for high pressures such as those which could occur, for example, if there is damage to a piston in one of the cylinders of the internal combustion engine and there is a correspondingly high blow-by rate, with the result that there may be damage to the valve covers.

U.S. Pat. No. 3,115,268 describes an arrangement or fastening for a valve cover for an internal combustion engine, in which helical compression springs are inserted into all of the fastening screws. This is intended to ensure a contact pressure that is as uniform as possible on the circumferential gasket between the valve cover and the cylinder head.

U.S. Pat. No. 4,027,644 furthermore discloses reducing the noise emissions due to structure borne noise by inserting resiliently flexible means into the fastening of the valve cover.

It is an object of the invention to ensure selective blow off of any excess pressure which may occur in the internal combustion engine by means which are simple in terms of design and construction.

SUMMARY OF THE INVENTION

Accordingly, the present invention is directed to an arrangement of a valve cover on the cylinder head of an internal combustion engine having at least one cylinder, wherein the cylinder head has gas exchange valves, which can be actuated by a valve timing system and are connected to at least one inlet and one exhaust port, and wherein at least one valve cover, which closes off the cylinder head at the top and is connected directly or indirectly, by at least one flow connection, to the crankcase of the internal combustion engine, is fixed on the cylinder head by a plurality of screwed joints, preferably with a circumferential gasket inserted in between. According to the invention, at least some of the screwed joints are provided with and/or coupled in such a way with a resiliently and/or elastically flexible element on a cold side of the cylinder head, which faces away from the at least one exhaust port in the cylinder head and hence faces a cold side of the engine, that the valve cover, in particular a defined cover area thereof, lifts off from the cylinder head and/or from the gasket only in the area of said cold side when there is a defined excess pressure in the crankcase.

In other words, all the screwed joints provided and/or coupled with a resiliently and/or elastically flexible element are arranged on the cold side, the opposite side from or side facing away from the exhaust port or exhaust ports in the cylinder head, this side being, in particular, a longitudinal side of the cylinder head or cylinder cover, and act on the valve cover in such a way that, when there is a defined excess pressure in the crankcase, said cover lifts off from the cylinder head and/or the gasket by a defined amount only in that area, i.e. in the area of the cold side. What is achieved by this measure is that the valve cover as such acts as a pressure relief valve, but with a selective outflow direction of the blow-by gases to the cold side of the internal combustion engine. On that side of the cylinder head or valve cover which forms a hot side of the internal combustion engine and which faces away from the cold side or is on the opposite side therefrom, on which, as well as on the ends or transverse sides that, as a rule, connect the two opposite sides at the ends, the fixed screwed joints are provided, the sealed seating and hence the sealing effect is maintained unchanged.

The result achieved by this measure according to the invention therefore is that the valve cover is lifted off selectively on the cold side of the engine only at a defined excess pressure, with the result that the gases blown off flow out only in the area of the cold side of the engine, thereby making it possible to significantly reduce the risk of the ignition of the gas or of constituents of the gas. With the solution according to the invention, it is thus possible to avoid not only wetting of components of the exhaust system with engine oil but, in particular, also destruction of the cover.

As already mentioned, the preferred embodiment involves a plurality of cylinders arranged in line, with the result that the cold side is formed by an opposite longitudinal side of the cylinder head and/or of the valve cover from the exhaust ports. In the case of a rectangular or box-shaped construction of the cylinder head and/or cylinder cover, which is the usual shape, the hot longitudinal side, which lies opposite the cold longitudinal side, is then connected to the cold longitudinal side by two transverse or end faces situated at the ends.

In the case of a cross-flow internal combustion engine, the respectively provided screwed joints with elastically and/or resiliently flexible elements are positioned in the cylinder head of the internal combustion engine on that side of the inlet ports which then forms the cold side, whereas, in the case of counterflow scavenging (inlet ports and exhaust ports on the same longitudinal side), the screwed joints with the elastically and/or resiliently flexible elements are then positioned opposite all the ports or both categories of port.

Depending on the design, it may be sufficient if only the at least one screwed joint on the cold side is provided and/or coupled with a resiliently and/or elastically flexible element. However, if appropriate, it is also possible for screwed joints situated close to the cold side to be provided or coupled with an elastically and/or resiliently flexible element at the ends or transverse sides adjoining that area.

The elastically and/or resiliently flexible element can be any suitable energy storage device or any suitable spring element, e.g. a rubber-elastic element, a diaphragm spring pack, etc. However, the preferably the elastically and/or resiliently flexible element is formed by at least one spring element, in particular a compression spring element, e.g. a helical compression spring, made of spring steel for example, which is integrated into the respective screwed joint in such a way that, in the assembled normal state, it preloads a valve-cover bearing area, which rests against and/or on the cylinder head, with a defined preloading force in the direction of the cylinder head, wherein this valve-cover bearing area lifts off from the cylinder head against the force of the spring element at a defined excess pressure. Helical compression springs as spring elements, in particular, can be matched well to a required spring rate and are robust, resistant to ageing and resistant to the effects of temperature.

According to a particularly preferred embodiment of the invention, it is proposed that the screwed joint have a screw bolt, which is screwed into the cylinder head through the valve-cover bearing area of the valve cover, which is formed by an edge flange for example, wherein a bolt shank of the screw bolt, which bolt shank projects above the valve-cover bearing area by a defined and/or predetermined amount, passes through the spring element in such a way that the spring element is clamped, in each case directly or indirectly, between a stop element on the bolt shank side, on the one hand, and the valve-cover bearing area, on the other hand, and exerts a defined or predetermined contact force as a preloading force on the valve-cover bearing area. With such an embodiment, a functionally reliable screwed joint, which allows the valve cover to be firmly attached to the cylinder head in the desired manner, is made available in a simple manner in the normal state. On the other hand, however, a functionally reliable lift-off function is made available in the manner described above under a defined excess pressure.

According to a first particularly preferred specific embodiment of the invention, it is proposed that the stop element on the bolt shank side be formed by a screw head of the screw bolt or by a screw nut that can be screwed onto a screw bolt or by at least one projection on the bolt shank side, e.g. a step and/or an annular collar or the like, on which the spring element is supported. This gives rise to a large variety of design embodiments which can be adapted to the respective application in an extremely simple manner.

A particularly preferred embodiment here is one in which the spring element is supported indirectly on the valve-cover bearing area via a disc of the spring-plate type, through which the bolt shank of the screw bolt passes. Apart from its spring plate function, this disc also basically has a function similar to that of a shim or washer and is guided loosely so as to allow movement on the bolt shank of the screw bolt. With such a construction, particularly stable and functionally reliable fixing, on the one hand, and also functional reliability in the lifting off of the respectively desired valve cover area, on the other hand, are thus obtained overall.

According to another particularly preferred embodiment, it is proposed that the bolt shank of the screw bolt be surrounded by a sleeve, in particular a compression sleeve, which, when the screwed joint is assembled, is clamped directly or indirectly between the cylinder head, on the one hand, and a screw head or a screw nut of the screw bolt, on the other hand. With a sleeve of this kind, the preloading force can be absorbed in a particularly simple manner.

According to an alternative embodiment of the invention, the spring element can in each case be clamped between two spring plates, which are mounted on a screw bolt or screw shank. Moreover, the spring plates can each have a bush-shaped guide section, which projects into the interior of the helical compression spring, and a radially projecting bearing ring. The springs are thus held in position in a manner resistant to vibration, and the guide sections can simultaneously serve as outward deflection stops for the valve cover.

In an embodiment which is advantageous in terms of assembly, the respective screw bolt can be screwed securely into a threaded hole in the cylinder head, the spring plate being clamped to the helical compression spring in each case by means of a self-locking screw nut (the use of an additional lock nut is likewise possible).

It is furthermore possible in each case for a damping disc to be inserted between the spring plate at the bottom and the facing valve-cover bearing area, e.g. a flange, of the valve cover. The disc will not only perform an additional sealing function in regular engine operation but also damp potential vibrational excitation.

Finally, the valve cover can be of elastic design and/or can be produced from a material capable of elastic deformation within defined or predetermined limits, in particular a plastic material, at least in the area of the at least one screwed joint provided and/or coupled with a resiliently and/or elastically flexible element. This makes it possible to design the valve cover selectively even for small pressure loads, with the result that, within the scope of its component elasticity and/or in conjunction with the elastically and/or resiliently flexible element, the valve cover makes possible a selective blow-off function.

The valve cover is preferably designed as a cover which fits around the entire cylinder head and is made from a single material and/or is of integral design but, in principle, could also be formed by a number of separate individual covers assigned to one or more cylinders.

The gasket between the cylinder head and the valve cover is preferably arranged loosely therebetween, as a result of which the gasket can be blown out or damaged if the valve cover lifts off in this area. According to an alternative embodiment of the invention, it is proposed that, in the mounted normal position, the gasket be connected securely to the cylinder head and/or the valve cover, at least in the area of the at least one screwed joint coupled and/or provided with an element that has a resiliently or elastically flexible action, or be at least held there, thus ensuring that the gasket remains substantially in the normal position as the blow-by gases are blown out and the valve cover lifts off and therefore that the sealed seating or the gasket is not impaired or destroyed. In this case, the gasket can be adhesively bonded to the cylinder head or the valve cover, for example, or can be held there in some other way materially and/or nonpositively and/or positively, being guided and/or clamped in corresponding grooved channels, for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An illustrative embodiment of the present invention is described in greater detail below with reference to the schematic drawings in which.

DETAILED DESCRIPTION OF THE PRESENTLY PREFERRED EMBODIMENTS

Figure 1:
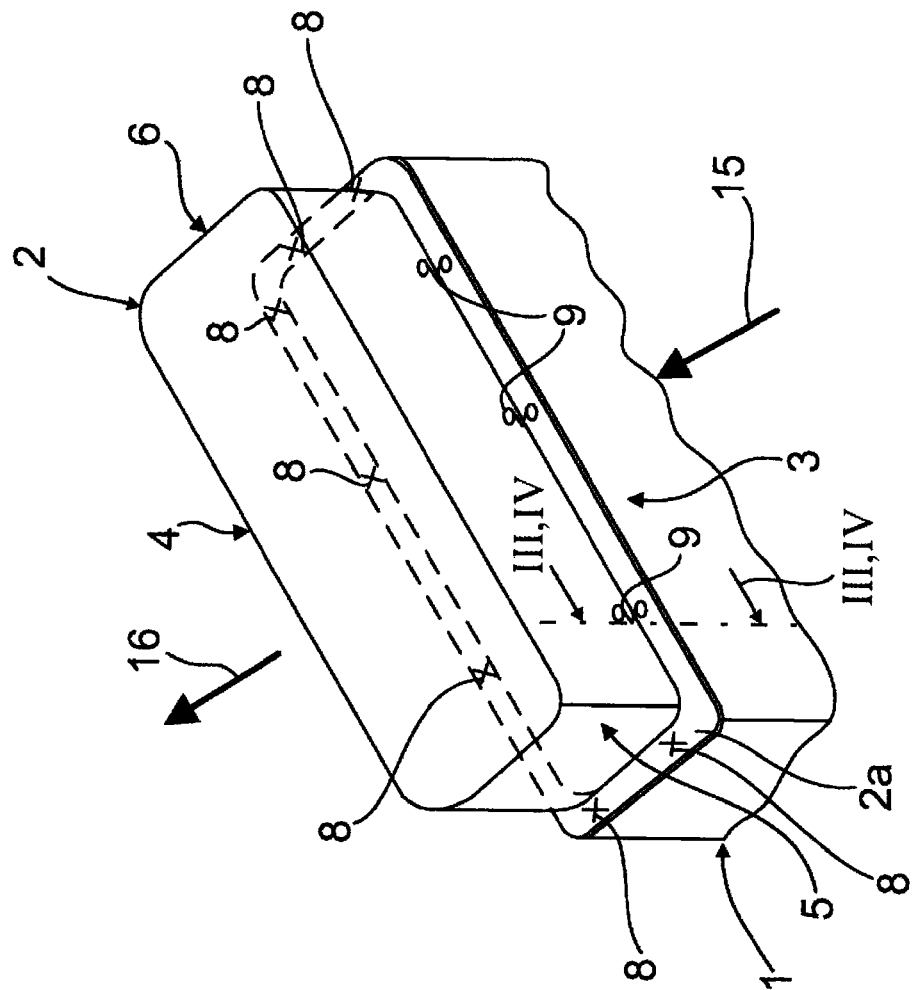
FIG. 1 is an illustrative and diagrammatic view of a cylinder head and a valve cover of an in-line internal combustion engine operating on the cross-flow principle, having some fixed and some resiliently flexible screwed joints on the valve cover.
Figure 2:
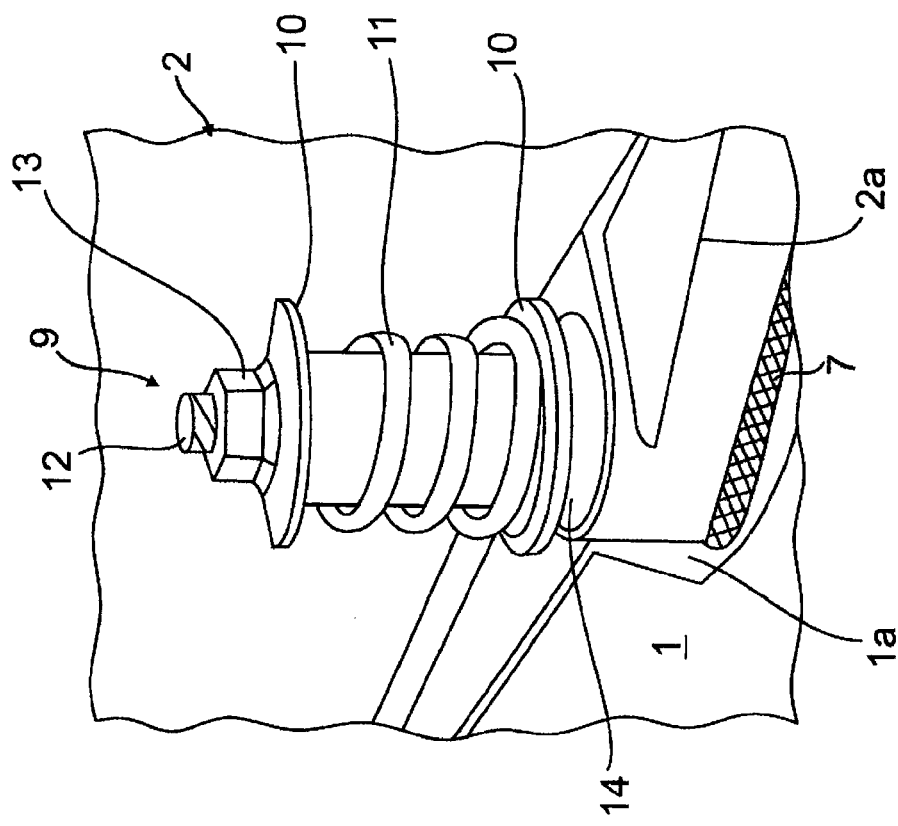
FIG. 2 is a dimensional view of one of the resiliently flexible screwed joints between the cylinder head and the valve cover.

In FIG. 1, the cylinder head 1 of an in-line internal combustion engine with, for example, four cylinders is partially indicated. This cylinder head 1 is covered at the top by a valve cover 2. As seen in plan view, the cylinder head 1 and the valve cover 2 are approximately rectangular, with two longitudinal sides 3, 4 and two transverse sides 5, 6.

Inlet valves and exhaust valves, which adjoin inlet ports and exhaust ports and are actuated by a valve timing system (not shown), are provided in a manner not shown in the cylinder head 1 for each cylinder of the internal combustion engine. The arrangement of the gas exchange valves and of said inlet and exhaust ports is chosen in such a way that gas exchange takes place by the crossflow principle; in other words from longitudinal side 3 as the inlet side (=cold side of the engine) to longitudinal side 4 as the exhaust side (=hot side of the engine), in accordance with the arrows 15 and 16 shown in FIG. 1.

An air injection manifold, combustion air lines, boost pressure lines, etc. adjoin the inlet ports in a known manner, while exhaust manifolds, exhaust lines and, if appropriate, the turbine of an exhaust turbocharger, etc. are connected to the exhaust ports.

The internal combustion engine (not shown specifically) has a crankcase breather, comprising at least one internal connection from the cylinder head/crankcase to the cylinder head 1, via which the blow-by gases are discharged to the intake system in a known manner.

The plastic valve cover 2 has an outward-projecting circumferential flange 2a as a valve-cover bearing area with corresponding holes, via which, with a gasket 7 (FIG. 3) in between, it is fastened in a leaktight manner on a flat support 1a of the cylinder head 1 by a plurality of fixed screwed joints 8 (indicated as a cross in FIG. 1) and by screwed joints 9 coupled with elastically and/or resiliently flexible elements.

The fixed screwed joints 8 (FIG. 1) are formed by known fasteners, such as screws screwed into threaded holes in the cylinder head 1, or by fixed screw bolts and screwed-on screw nuts with shims in between (not shown). The fixed screwed joints 8 are arranged on the "hot" longitudinal side 4 (on the longitudinal side facing the exhaust ports in the cylinder head 1) and on the ends or transverse sides 5 and 6 in a number and at a spacing such that leaktight uniform contact of the valve cover 2 with the cylinder head 1 is ensured.

The resiliently flexible screwed joints 9, which are described in greater detail below, are provided on the "cold" longitudinal side 3 (on the longitudinal side of the inlet ports).

Figure 3A:
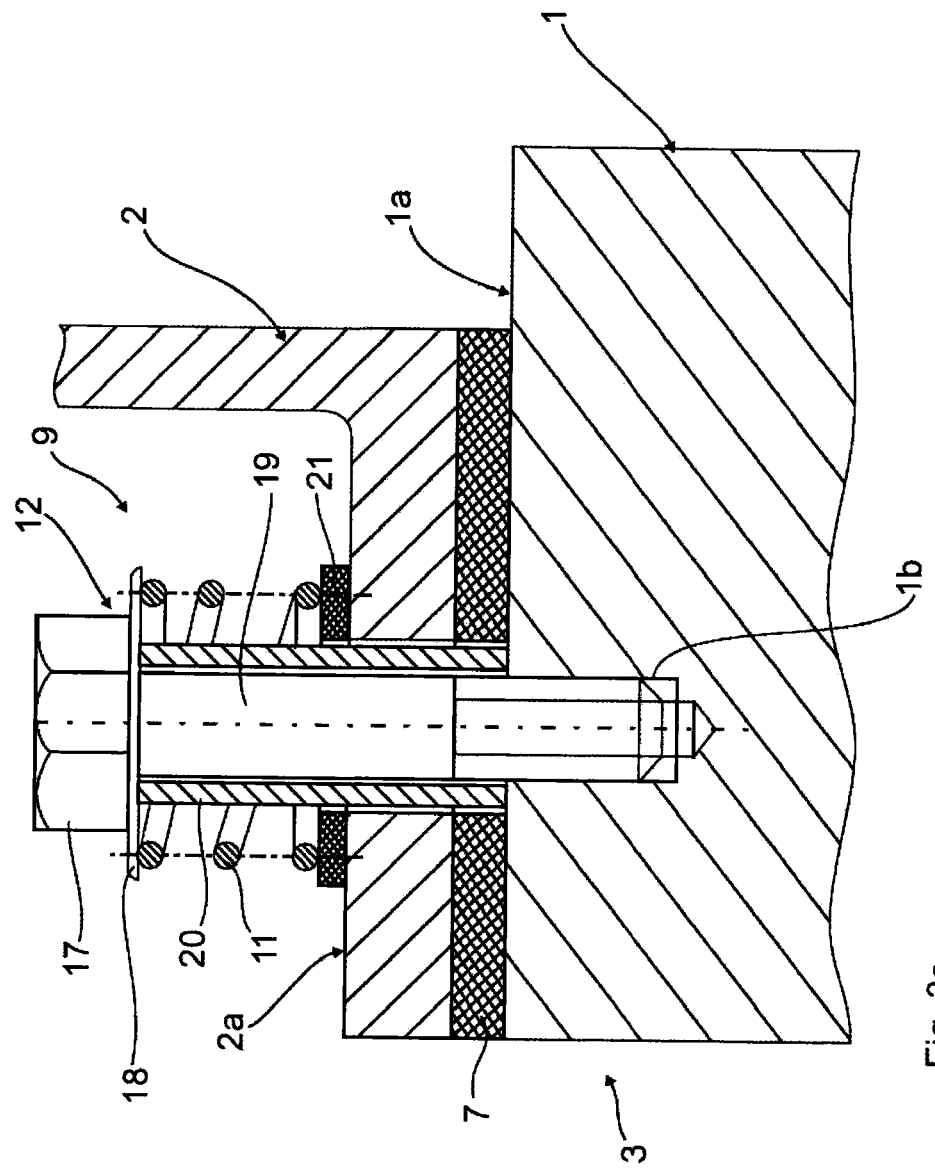
FIG. 3a is a three cross-sectional view along the line III-III in FIG. 1 through one of the screwed joints coupled to a resiliently flexible element and having a compression spring element clamped between a screw head and a disc resting on a flange as a valve-cover bearing area.
Figure 3B:
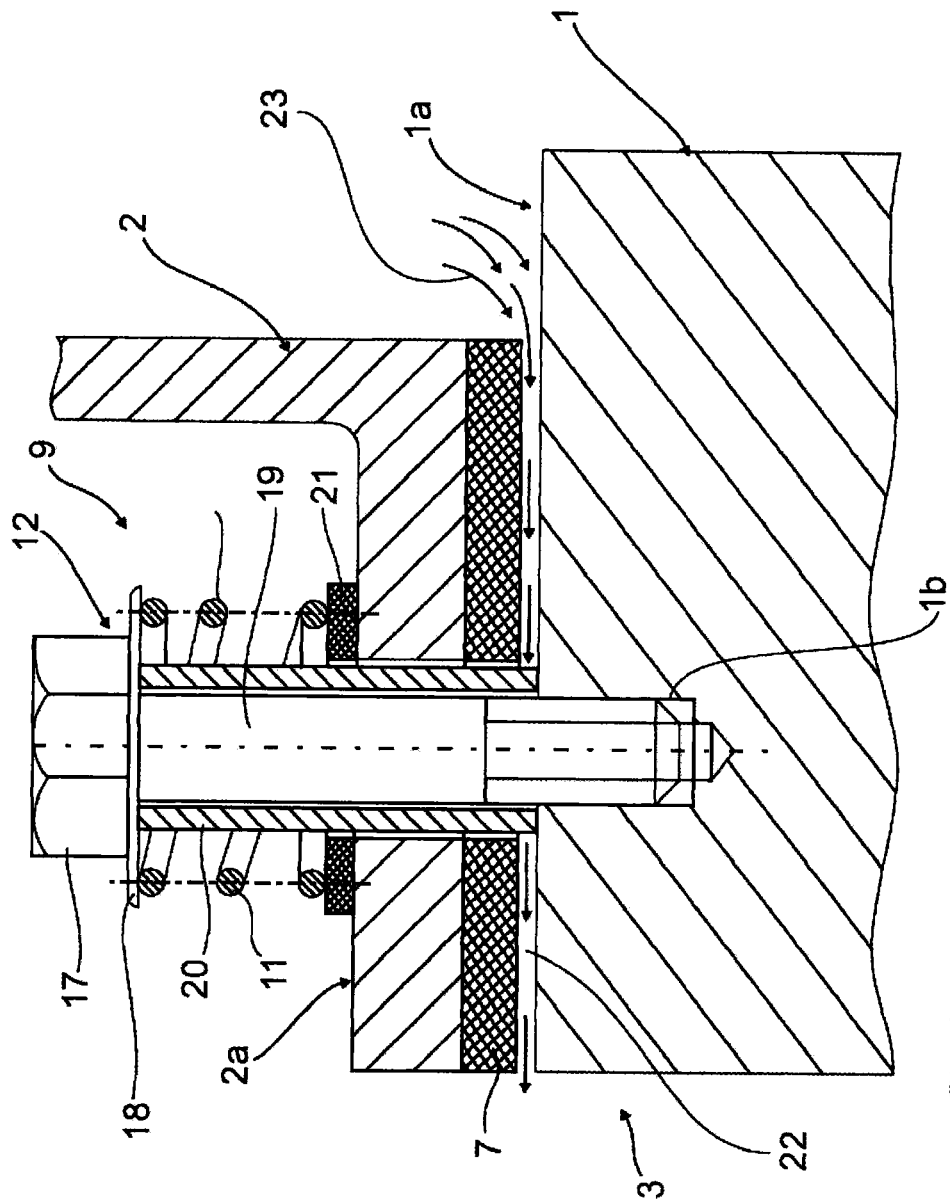
FIG. 3b is the cross-sectional view of FIG. 3a with the valve cover lifted off in the case of excess pressure.

FIGS. 3a and 3b show a particularly preferred embodiment according to the invention of a screwed joint 9 which is provided and/or coupled with a resiliently flexible element, consisting essentially of a spring, here designed as a helical compression spring 11 by way of example, and of a screw bolt 12 inserted securely or screwed into the cylinder head 1. The screw bolt 12 has a screw head 17 with an annular screw-head collar 18. Starting from the screw head 17 or annular collar 18, a bolt shank 19, which has a threaded projection at the end, extends through a valve-cover bearing area (here designed as a flange 2a) of the valve cover 2 and through a gasket 7 as far as the cylinder head 1. To be able to apply a defined preloading force during the tightening of the screw bolt 12, the bolt shank 19 is surrounded by a compression sleeve 20, or the bolt shank 19 of the screw bolt 12 passes through said compression sleeve 20, which is supported between the annular collar 18 of the screw head 17 and an edge region around the threaded hole 1b.

Arranged around the compression sleeve 20 there is furthermore a disc 21, which is preferably designed as a flat, level disc and furthermore preferably rests on the flange 2a to form a flat contact joint.

The helical compression spring 11 extends between the disc 21 and an underside of the annular collar 18 of the screw head 17 and, in the assembled state shown in FIG. 3a, thus presses the flange 2a towards the bearing surface 1a of the cylinder head 1 with a defined contact force as a preloading force.

If a defined excess pressure builds up within the valve cover 2, the valve cover 2 can be lifted off from the bearing surface 1a of the cylinder head 1, against the force of the helical compression spring 11, in the area of the screwed joints 9 on the cold longitudinal side 3, acting as a pressure relief valve, and a gap 22 (FIG. 3b) is thereby formed between the valve cover 2 or the flange 2a thereof and the cylinder head 1, through which the gases 23 can escape to relieve the pressure. This is illustrated purely schematically and by way of example in FIG. 3b.

This pressure relief enables major damage to the internal combustion engine, e.g. bursting of the valve cover 2 and associated effects, to be avoided. In order to allow this lifting off, provision is preferably also made for the valve cover 2 to be designed to be elastically deformable to a defined extent. It may furthermore be mentioned at this point that, in the case where the gasket 7 is put in place loose, it is also possible for the gasket 7 to lift off from the cylinder head 1 only partially, if at all, and, accordingly, the gap 22 can then also be formed between the gasket 7 and the valve cover 2. Where the gasket 7 is put in place loose in this way, the gasket 7 is as a rule blown out, and therefore, in order to fix it in position, there is also the possibility, if appropriate, of holding and/or fixing the gasket 7 in the area of the valve cover 2 or of the cylinder head 1, at least over a certain area, e.g. by any suitable material and/or nonpositive and/or positive joint.

Figure 4:
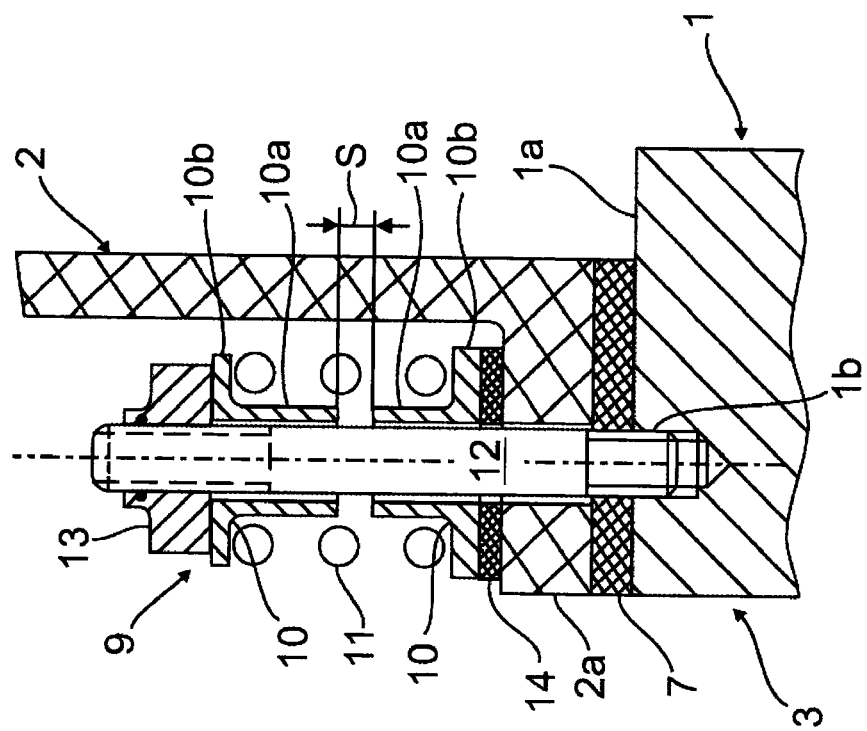
FIG. 4 is a cross-sectional view along the line IV-IV in FIG. 1 through one of the screwed joints coupled to a resiliently flexible element and having a helical compression spring clamped between two spring plates.

According to an alternative embodiment, which is shown in FIG. 4, a screwed joint 9 provided and/or coupled with a resiliently flexible element comprising essentially a helical compression spring 11, which is made from a spring steel of defined spring constant and is clamped between two spring plates 10, and of a screw bolt 12 inserted securely into the cylinder head 1 and having a screwed-on screw nut 13 of self-locking design.

The spring plates 10 are of hat-shaped design in cross section (FIG. 3) and, in this case, each have a bush-shaped guide section 10a and a radially projecting bearing ring 10b. The guide section 10a is guided on the shank of the screw bolt 12 substantially positively or with a defined annular clearance and simultaneously forms an outer guide for the helical compression spring 11 surrounding it.

The screw bolt 12 is screwed securely into a threaded hole 1b machined into the cylinder head 1 on the bearing surface 1a thereof and has an upward-projecting shank, onto which, in steps which follow on in the assembly sequence from the placement of the gasket 7 (which is, if appropriate, bonded firmly to the cylinder head 1, at least in the partial areas surrounding the screwed joints 9, or is held there positively and/or materially and/or nonpositively in some other way) and the mounting of the valve cover 2 with the flange 2a, a damping disk 14, the bottom spring plate 10 with the upward-facing guide section 10a, the helical compression spring 11 and the top spring plate 10 with the downward-projecting guide section 10a are mounted. The screw nut 13 is then attached.

The screw nut 13 of this screwed joint 9 is screwed on in such a way that, at a defined preload of the helical compression spring 11, there is still an axial spacing S between the guide sections 10a of the spring plates 10, allowing the longitudinal side 3 of the valve cover 2 to lift off when there is a defined excess pressure within the valve cover 2. The mutually facing ends of the guide sections 10a can serve as outward deflection stops, if appropriate.

As a result at a defined excess pressure, the "hot" longitudinal side 4 and, to a substantial degree, the transverse sides 5 and 6 of the valve cover 2 remain sealed, while the valve cover 2 lifts off at the "cold" longitudinal side 3, acting as a pressure relief valve, and brings about pressure relief which contributes to the avoidance of major damage to the internal combustion engine, e.g. bursting of the valve cover 2 and associated effects. For this purpose, the valve cover 2 is preferably designed to be elastically deformable to a defined extent.

The invention is not restricted to the illustrative embodiments described. On the contrary, modifications familiar to a person skilled in the art are possible within the scope of the patent claims.

By way of example, a simple screw nut and a second lock nut can be used instead of a self-locking screw nut 13 in the case of the screwed joint 9 provided with a resiliently flexible element as shown in FIG. 4. Instead of a fixed screw bolt 12, it would also be possible to use self-locking or additionally secured screws of corresponding length.

In addition to the preferred use of helical compression springs 11 in the embodiments described above, it would also be possible to use rubber-elastic spring elements, diaphragm spring packs or other spring elements which allow selective lift-off of said longitudinal side 3 of the valve cover 2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A valve cover arrangement for an internal combustion engine comprising:
   a cylinder head having at least one cylinder, and gas exchange valves which can be actuated by a valve timing system and connected to at least one inlet and one exhaust port;
   said cylinder head having a cold side located opposite said at least one exhaust port;
   a valve cover for closing off said cylinder head and connected by a flow connection to a crankcase of the internal combustion engine;
   a plurality of screwed joints for mounting said valve cover to said cylinder head; said screwed joints comprising at least one of a resiliently and elastically flexible element on said cold side of said cylinder head facing away from said at least one exhaust port; said at least one of a resiliently and elastically flexible element constructed so that said valve cover lifts off from said cylinder head in a defined area of said cover only in the area of said cold side when there is a defined excess pressure in the crank case.

2. The valve cover arrangement of claim 1, wherein said cylinder head comprises a plurality of cylinders arranged in line so that said cold side is formed by a longitudinal side of one of said cylinder head and said valve cover which is opposite said exhaust port.

3. The valve cover arrangement of claim 2, wherein the internal combustion engine is a cross-flow internal combustion engine; said at least one screwed joint comprising said at least one of a resiliently and elastically flexible element positioned on the side of the internal combustion engine facing said at least one inlet port in said cylinder head and forming said cold side.

4. The valve cover arrangement of claim 1, wherein the internal combustion engine is a cross-flow internal combustion engine; said at least one screwed joint comprising said at least one of a resiliently and elastically flexible element positioned on the side of the internal combustion engine facing said at least one inlet port in said cylinder head and forming said cold side.

5. The valve cover arrangement of claim 1, additionally comprising a first and second side adjoining said cold side in a substantially transverse direction and at the opposite ends of said cold side; and at least one screwed joint directly adjacent said cold side, said screwed joint comprising at least one of said resiliently and elastically flexible elements on said sides adjoining said cold side.

6. The valve cover arrangement of claim 1, additionally comprising a valve-cover bearing area; and wherein said at least one resiliently and elastically flexible element comprises a spring element coupled with said respectively associated screwed joint such that, in an assembled state, said spring element preloads said valve-cover bearing area with a defined preloading force in the direction of said cylinder head; said valve-cover bearing area lifting off from said cylinder head against the force of said spring element at a defined excess pressure.

7. The valve cover arrangement of claim 6, wherein said sprint element is a compression spring.

8. The valve cover arrangement of claim 7, wherein said screwed joint comprises a screw bolt screwed into said cylinder head through said valve-cover bearing area; said screwed joint further comprising a bolt shank projecting above said valve-cover bearing area by a predetermined amount, said bolt shank passing through said compression spring, directly or indirectly, between a stop element on said bolt shank and said valve-cover bearing area so as to exert a predetermined contact force on said valve-cover bearing area in the direction of said cylinder head.

9. The valve cover arrangement of claim 8, wherein said bolt shank comprises a stop element formed by one of a screw head, a screw nut and a projection on said bolt shank.

10. The valve cover arrangement of claim 9, wherein said projection is one of a step and an annular collar for supporting said spring element.

11. The valve cover arrangement of claim 9, additionally comprising a disc for supporting said spring element on said valve-cover bearing area; said bolt shank of said screw bolt extending through said disc.

12. The valve cover arrangement of claim 9, additionally comprising a sleeve surrounding said bolt shank of said screw bolt for clamping between said cylinder head and said screw head.

13. The valve cover arrangement of claim 7, additionally comprising two spring plates mounted on said screw bolt for clamping said spring element therebetween; said spring plates comprising a radially projecting bearing ring and a bush-shaped guide section projecting into the interior of said compression spring element.

14. The valve cover arrangement of claim 13, wherein said cylinder head comprises a threaded hole and said screw bolt is screwed into said threaded hole; said spring plate being clamped to said spring element by a self-locking screw nut.

15. The valve cover arrangement of claim 13, additionally comprising a damping disc disposed between said spring plate and said valve-cover bearing area of said valve cover.

16. The valve cover arrangement of claim 1, wherein said valve cover is one of elastic design and produced from a material capable of elastic deformation, at least in the area of said at least one screwed joint.

17. The valve cover arrangement of claim 1, wherein said valve cover is constructed as a unitary structure so as to fit around the entire cylinder head.

18. The valve cover arrangement of claim 1, additionally comprising a gasket disposed between said cylinder head and said valve cover.

19. The valve cover arrangement of claim 1, additionally comprising a gasket connected to one of said cylinder head and said valve cover by one of a form fitting and force fitting connection at least in the area of said flexible element.

* * * * *